United States Patent
Izawa et al.

(10) Patent No.: US 10,095,625 B2
(45) Date of Patent: Oct. 9, 2018

(54) STORAGE SYSTEM AND METHOD FOR CONTROLLING CACHE

(71) Applicant: Hitachi, Ltd., Tokyo (JP)

(72) Inventors: Shinsuke Izawa, Tokyo (JP); Sadahiro Sugimoto, Tokyo (JP); Yuki Sakashita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/540,687

(22) PCT Filed: Jun. 19, 2015

(86) PCT No.: PCT/JP2015/067676
§ 371 (c)(1),
(2) Date: Jun. 29, 2017

(87) PCT Pub. No.: WO2016/203629
PCT Pub. Date: Dec. 22, 2016

(65) Prior Publication Data
US 2017/0357589 A1     Dec. 14, 2017

(51) Int. Cl.
*G06F 3/06*         (2006.01)
*G06F 12/0866*   (2016.01)
(Continued)

(52) U.S. Cl.
CPC ............ *G06F 12/0866* (2013.01); *G06F 3/06* (2013.01); *G06F 12/0888* (2013.01);
(Continued)

(58) Field of Classification Search
USPC ........................................................ 711/129
See application file for complete search history.

(56) References Cited

U.S. PATENT DOCUMENTS

| 8,285,935 B2 * | 10/2012 | Kasai | ................... | G06F 12/0888 |
| | | | | 711/118 |
| 2001/0032294 A1 * | 10/2001 | Katsuragi | ........... | G06F 11/1076 |
| | | | | 711/114 |

(Continued)

FOREIGN PATENT DOCUMENTS

JP    2010286923 A    12/2010

OTHER PUBLICATIONS

International Search Report of PCT/JP2015/067676 dated Sep. 1, 2015.

*Primary Examiner* — Shawn X Gu
*Assistant Examiner* — Jean C Edouard
(74) *Attorney, Agent, or Firm* — Mattingly & Malur, PC (57) ABSTRACT

When one of a plurality of storage apparatuses receives an input/output (IO) request in which the address of a logical volume is designated, a cache destination storage device in which I/O data conforming to the received I/O request is to be cached is determined on the basis of a target I/O pattern and/or a coupling mode. The I/O data is cached in the CM area of the cache destination storage device. The target I/O pattern is the one among a plurality of I/O patterns to which an I/O conforming to the received I/O request belongs. Each of the plurality of I/O patterns pertains to whether an I/O destination address in the logical volume is random or sequential. The coupling mode indicates whether or not a storage device that receives an I/O request in which the same address as that designated in the received I/O request is designated has been determined.

15 Claims, 10 Drawing Sheets

(51) Int. Cl.
  *G06F 13/10* (2006.01)
  *G06F 12/0888* (2016.01)
  *G06F 13/14* (2006.01)
  *G06F 13/42* (2006.01)
(52) U.S. Cl.
  CPC .............. *G06F 13/10* (2013.01); *G06F 13/14* (2013.01); *G06F 13/42* (2013.01); *G06F 3/0631* (2013.01)

(56) References Cited

U.S. PATENT DOCUMENTS

| | | | | |
|---|---|---|---|---|
| 2004/0039869 A1* | 2/2004 | Kurokawa | .......... | G06F 12/0862 711/100 |
| 2006/0179163 A1* | 8/2006 | Muramatsu | .......... | G06F 3/0605 710/1 |
| 2008/0059752 A1* | 3/2008 | Serizawa | .............. | G06F 3/0608 711/173 |
| 2008/0126616 A1* | 5/2008 | Kumasawa | .......... | G06F 1/3221 710/42 |
| 2008/0201341 A1* | 8/2008 | Okamoto | ............ | H04N 21/2312 |
| 2009/0316541 A1* | 12/2009 | Takada | .................. | G06F 1/3221 369/47.5 |
| 2010/0312967 A1 | 12/2010 | Kasai et al. | | |
| 2012/0017033 A1* | 1/2012 | Moritoki | .............. | G06F 11/1441 711/103 |
| 2012/0066458 A1* | 3/2012 | Chiba | ................... | G06F 3/0611 711/154 |
| 2012/0331234 A1* | 12/2012 | Hirao | .................... | G06F 12/084 711/135 |
| 2013/0091328 A1* | 4/2013 | Yoshihara | ........... | G06F 12/0817 711/118 |
| 2013/0111170 A1* | 5/2013 | Kikuchi | ................ | G06F 3/0608 711/165 |
| 2013/0232377 A1* | 9/2013 | Kakihara | ............... | G11C 29/72 714/6.13 |
| 2013/0311685 A1* | 11/2013 | Kudo | .................... | G06F 3/0611 710/40 |
| 2014/0089540 A1* | 3/2014 | Tsukada | ................ | G06F 3/0601 710/74 |
| 2014/0115255 A1* | 4/2014 | Takada | ................ | G06F 12/0875 711/119 |

* cited by examiner

Cache segment attribute management table
503

| Storage number | CTL number | Processor number | Cache segment attribute |
|---|---|---|---|
| 1 | 1 | 1 | Clean |
| 1 | 1 | 1 | Dirty |
| 1 | 1 | 1 | Free |
| 1 | 2 | 1 | Clean |
| 1 | 2 | 1 | Dirty |
| | | | |
| 2 | 2 | NULL | Free to share |

FIG. 7

Cache segment management table
504

| Cache segment number | VOL number | Intra- VOL segment number | Cache segment attribute | Dirty bit map | CTL number | Storage number |
|---|---|---|---|---|---|---|
| 1 | Null | Null | Free | 00000000 | 1 | 1 |
| 2 | 2 | 1 | Clean | 00000000 | 1 | 2 |
| 3 | 1 | 1 | Clean | 00000000 | 2 | 1 |
| 4 | 3 | 4 | Dirty | 00100010 | 2 | 2 |
| 5 | 4 | 5 | Dirty | 10010011 | 1 | 1 |

FIG. 8

Comparative example

FIG. 9

Comparative example

STORAGE SYSTEM AND METHOD FOR CONTROLLING CACHE

TECHNICAL FIELD

The present invention generally relates to cache control of a storage system.

BACKGROUND ART

In recent years, a technique called big data analysis is being put to practical use, which produces new value by analyzing an enormous amount of data relating to the social infrastructure such as social networking services, finance, medical care and traffic.

In big data analysis, amounts of input data collected from the social infrastructure and output data which are analysis results is extremely large, and continues to increase over time. A storage system plays an important role in an enterprise IT system as a platform for securely storing and managing such an enormous amount of big data.

For example, an enterprise providing cloud service constructs a storage system with resources which are required at the moment upon initial operation of service to reduce introduction cost. As the storage system, for example, a scale-out type storage system is employed. That is, when the service operates and an amount of utilization of resources increases, overall processing performance of the system is improved by increasing the number of storage apparatuses (nodes).

As one means for improving processing performance of the storage system, there can be cache control of the storage system. Concerning cache control, for example, a technique of PTL 1 is known. PTL 1 discloses controlling a cache size to be allocated as cache control.

CITATION LIST

Patent Literature

[PTL 1] Japanese Patent Laid-Open No. 2010-286923

SUMMARY OF INVENTION

Technical Problem

Typically, storage apparatuses in a scale-out type storage system are coupled through "loose coupling". In the present specification, "loose coupling" means coupling between storage apparatuses which does not allow input/output of data from one storage apparatus to a cache memory area (CM area) of another storage apparatus. In loosely coupled storage apparatuses, one storage apparatus manages its own CM area, but does not manage the CM area of another storage apparatus. Therefore, while one storage apparatus can secure a cache segment (one example of a CM sub-area) which is data storage destination from its own CM area, the storage apparatus cannot secure a cache segment from the CM area of another storage apparatus. As a result, in the case where I/O data (data to be input/output according to an I/O request) is transferred between loosely coupled storage apparatuses, the I/O data is stored in both a CM area of a storage apparatus which is a transfer source and a CM area of a storage apparatus which is a transfer destination.

Therefore, it is studied to "tightly couple" storage apparatuses in the scale-out type storage system. In the present specification, "tight coupling" means coupling between storage apparatuses which allows input/output of I/O data from one storage apparatus to a CM area of another storage apparatus. In tightly coupled storage apparatuses, one storage apparatus manages the CM area of another storage apparatus in addition to its own CM area. Therefore, one storage apparatus can secure a cache segment from either its own CM area or the CM area of another storage apparatus. As a result, in the case where I/O data is transferred between tightly coupled storage apparatuses, the I/O data is stored in only one of a CM area of a storage apparatus which is a transfer source and a CM area of a storage apparatus which is a transfer destination.

In this manner, while, in tight coupling, only one CM area is required for securing a cache segment for one piece of I/O data (while there can be a case where a cache segment is made duplex, in that case, only one CM area is required for securing a main cache segment).

However, as a result, the number of times that I/O data is transferred from the CM area to a host in the storage system can increase. A specific example will be described below. It should be noted that, in the description of a specific example of a problem, a storage controller (CTL) is made duplex in each storage apparatus, and each CTL has a CM area. A storage apparatus which receives an I/O request can be referred to as a "host side storage apparatus", a component XX of the host side storage apparatus can be referred to as a "host side XX", and a host side CTL which receives an I/O request can be referred to as an "I/O recipient CTL". Further, a storage apparatus which has a PDEV (physical storage device) which stores I/O data can be referred to as a "PDEV side storage apparatus", and a component XX at the PDEV side storage apparatus can be referred to as a "PDEV side XX".

(Specific Example 1 of Problem (FIG. 8))

Figure 8:
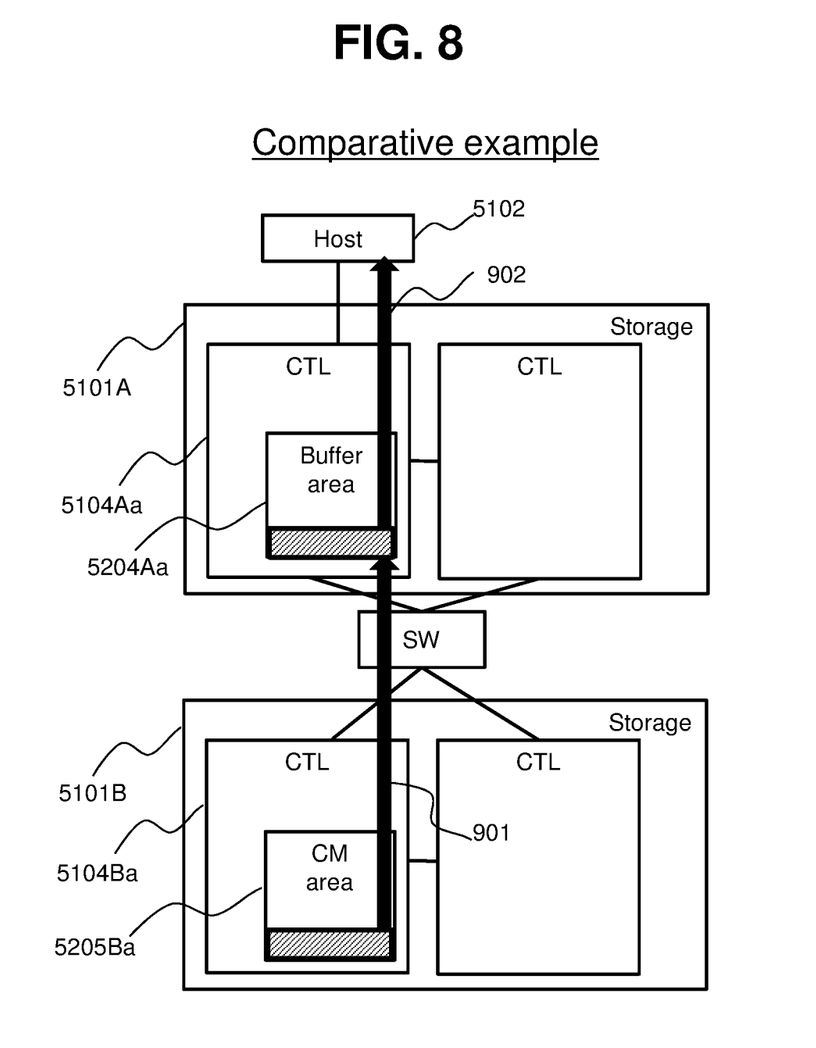
FIG. 8 is an outline view of a specific example 1 of a comparative example.

When a host side CTL 5014Aa receives a read request from a host 5102, it is assumed that a cache segment is secured from a CM area 5205Ba within a PDEV side CTL 5014Ba. In this case, read data is stored in the PDEV side CM area 5205Ba from a PDEV 5110 (arrow 901), and, then, transferred in two stages. That is, the read data is transferred from the PDEV side CM area 5205Ba to a buffer area 5204Aa within the host side CTL 5104 Aa (arrow 902), and the read data is transferred from the host side buffer area 5204Aa to the host 5102 (arrow 903).

Subsequently, when the host side CTL 5104Aa receives a read request of the same read data, similar two-stage transfer occurs. This is because a CM area of the read data is the PDEV side CM area 5205Ba, and the transferred read data is not left in the host side buffer area 5204Aa, unlike with the CM area.

In this manner, if the CM area of the read data is at the PDEV side, every time a read request of the same data is received, two-stage transfer including data communication between storage apparatuses occurs. Therefore, performance can degrade. While it can be considered that the host side CM area is set as the CM area of the read data to avoid two-stage transfer, this is not easy, because which storage apparatus becomes a host side storage apparatus is unknown until the read request is received. In other words, any storage apparatus can receive a read request from the host.

(Specific Example 2 of Problem (FIG. 9))

Figure 9:
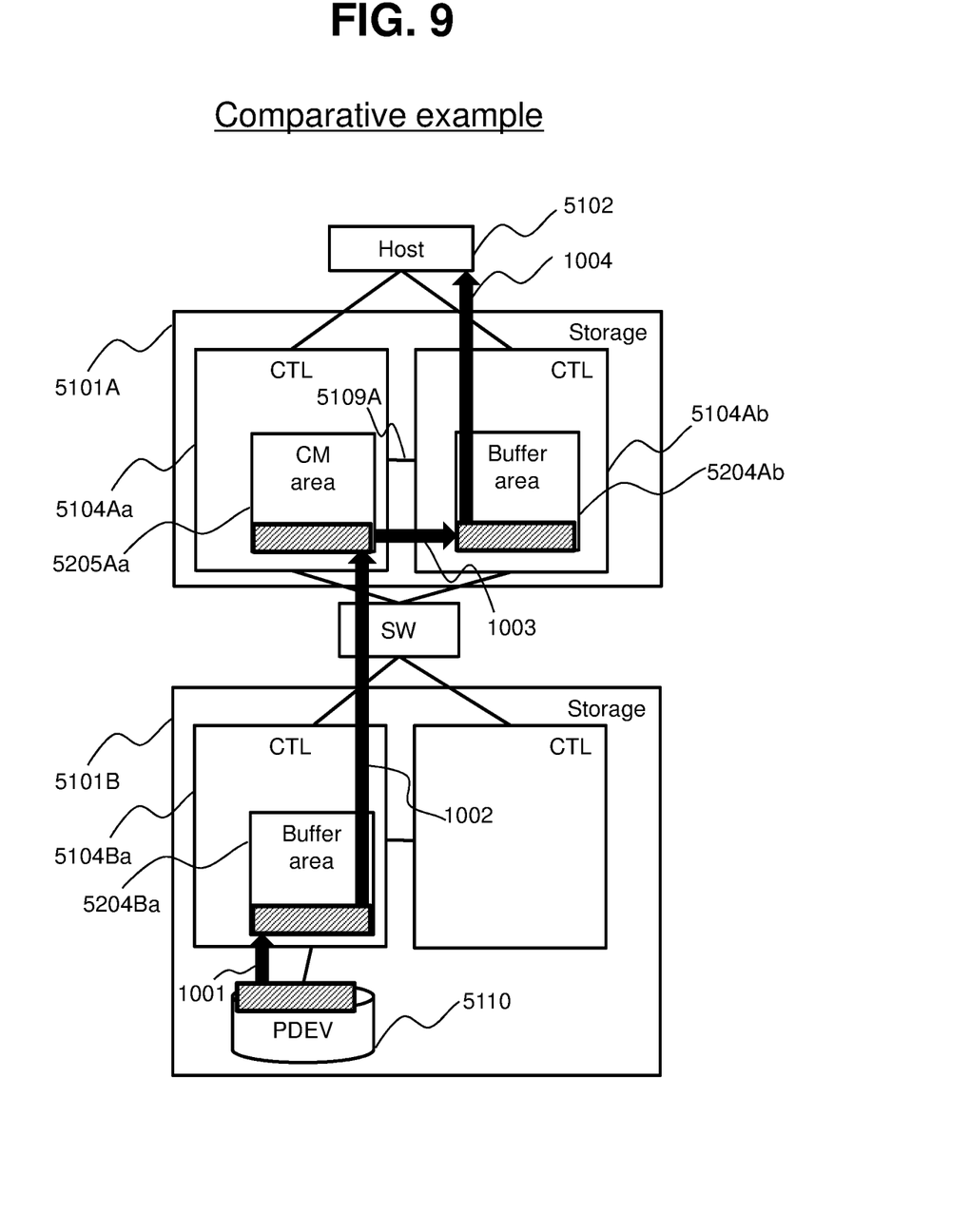
FIG. 9 is an outline view of a specific example 2 of a comparative example.

It is assumed that both a CTL 5104Aa and a CTL 5014Ab within the same storage apparatus 5101A can receive an I/O request from the host 5102. In other words, it is assumed that the storage apparatus 5101A is coupled to the host 5102 while both are active. Further, it is assumed that, in the case where the storage apparatus 5101A determines to execute sequential read as processing of at least one read request, data which is predicted to be eventually read through sequential read is read ahead (read in advance) in the CM area 5205Aa or 5205Ab.

It is assumed that one CTL 5104Aa receives a read request from the host 5102, secures a cache segment from the CM area 5205Aa and determines execution of sequential read. In this case, read data is transferred from the PDEV 5110 to the buffer area 5204b of the PDEV side CTL 5104Ba, and the read data is transferred from the PDEV side buffer area 5204Bb to the host side CM area 5205Aa (secured cache segment), and transferred from the host side CM area 5205Aa to the host 5102. In parallel to the series of processing (or after the series of processing), data which is predicted to be sequentially read is transferred from the PDEV 5110 to the PDEV side buffer area 5204b (arrow 1001), and the data is transferred from the PDEV side buffer area 5204Bb to the host side CM area 5205Aa (arrow 1002). That is, data is read ahead in the host side CM area 5205Aa.

However, it is assumed that, subsequently, a read request in which read ahead data is designated is received by another CTL 5104Ab. In this case, the data is transferred from the CM area 5205Aa to the buffer area 5204Ab of the CTL 5104Ab (arrow 1003), and the data is transferred from the buffer area 5204Ab to the host 5102 (arrow 1004).

As described above, when, after data is read ahead in the CM area 5205Aa of one CTL 5104Aa which receives the previous read request, the other CTL 5104Ab receives a read request of the read ahead data, data transfer between the CTL 5104Aa and the CTL 5104Ab occurs. As a result, a bandwidth of a path 5109A between the CTL 5104Aa and the CTL 5104Ab is consumed. In a use case of analysis, backup, or the like, which requires sequential read, because a bandwidth between CTLs tends to be largely consumed, it is desirable to avoid data transfer between CTLs.

The above-described problem cannot be resolved even by utilizing cache size control as disclosed in PTL 1. This type of problem can occur also in storage systems used for purposes other than the purpose described in background art.

Solution to Problem

In the case where any one of a plurality of storage apparatuses receives an I/O (Input/Output) request in which an address of a logical volume is designated, a cache destination storage apparatus in which I/O data which is data conforming to the received I/O request is to be cached is determined based on at least one of a target I/O pattern and a coupling mode. The I/O data is cached in a CM area of the cache destination storage apparatus. The target I/O pattern is an I/O pattern which conforms to the received I/O request and to which I/O belongs among a plurality of I/O patterns. Each of the plurality of I/O patterns is a pattern relating to whether I/O destination address in the logical volume is random or sequential. The coupling mode indicates whether or not a storage apparatus which receives the I/O request in which the same address as an address designated in the received I/O request is designated is determined.

Advantageous Effects of Invention

A cache destination storage apparatus is determined based on at least one of a target I/O pattern and a coupling mode. Therefore, it is possible to reduce the number of times that I/O data is transferred from a CM area to a host in a storage system.

DESCRIPTION OF EMBODIMENTS

An embodiment will be described below with reference to the drawings.

In the following description, while information will be described using expression of an "abc table", the information may be expressed with a data configuration other than a table. In order to indicate that the information does not depend on the data configuration, at least one of "abc table" can be referred to as "abc information". Further, in the following description, a configuration of each table is an example, and one table may be divided into two or more tables, or all or part of two or more tables may be one table.

Further, in the following description, an ID of a component refers to identification information (for example, an identifier) of the component, and the identification information can be expressed with a character, a number, a symbol or combination thereof, or the like (for example, name).

Further, in the following description, there is a case where, in the case where the same type of components is described without distinction, a common sign (or a reference numeral) in a reference numeral is used, and, in the case where the same type of components is described distinctively, reference numerals (or IDs of the components) are used.

Further, in the following description, a "storage unit" may be one or more storage devices including a memory. For example, the storage unit may be at least a main storage device among a main storage device (typically, a volatile memory) and an auxiliary storage device (typically, a non-volatile storage device). Further, the storage unit may include at least one of a CM area (for example, a cache memory or an area of part of the cache memory) and a buffer area (for example, a buffer memory or an area of part of the buffer memory).

Further, in the following description, "PDEV" means a physical storage device, and, typically, maybe a non-volatile storage device (for example, an auxiliary storage device). PDEV may be, for example, an HDD (Hard Disk Drive) or an SSD (Solid State Drive).

Further, in the following description, "RAID" is abbreviation of Redundant Array of Independent (or Inexpensive) Disks. An RAID group is configured with a plurality of PDEVs, and data is stored according to an RAID level associated with the RAID group. The RAID group may be also referred to as a parity group. The parity group may be, for example, an RAID group which stores parity.

Further, in the following description, while there is a case where processing is described using a "program" as a subject, because the program performs determined processing using a storage unit (for example, a memory) and/or an interface device (for example, a communication port), or the like, as appropriate by being executed by a processor (for example, a CPU (Central Processing Unit)), the subject of the processing may be a processor. Processing described using a program as a subject may be processing performed by a processor or an apparatus or a system having the processor. Further, the processor may include a hardware circuit which performs part or all of the processing. The program may be installed in an apparatus like a computer from a program source. The program source may be, for example, a program distribution server or a storage medium which can be read by the computer. In the case where the program source is a program distribution server, the program distribution server includes a processor (for example, a CPU) and a storage unit, and the storage unit may further store a distribution program and a program to be distributed. The processor of the program distribution server may distribute a program to be distributed to other computers by the processor of the program distribution server executing a distribution program. Still further, in the following description, two or more programs may be implemented as one program, or one program may be implemented as two or more Further, in the following description, a "host system" is a system which transmits an I/O request to a storage system, and may include an interface device, a storage unit (for example, a memory) and a processor coupled to the interface device and the storage unit. The host system may be configured with one or more host computers. At least one host computer may be a physical computer, and the host system may include a virtual host computer in addition to a physical host computer.

An example of a storage system which determines a cache destination storage apparatus according to at least one of an I/O pattern and a coupling mode will be described below. It should be noted that an embodiment which will be described below does not limit the invention according to the claims, and all the combinations of characteristics described in the embodiment are not always required for solving the problems of the invention.

Figure 1:
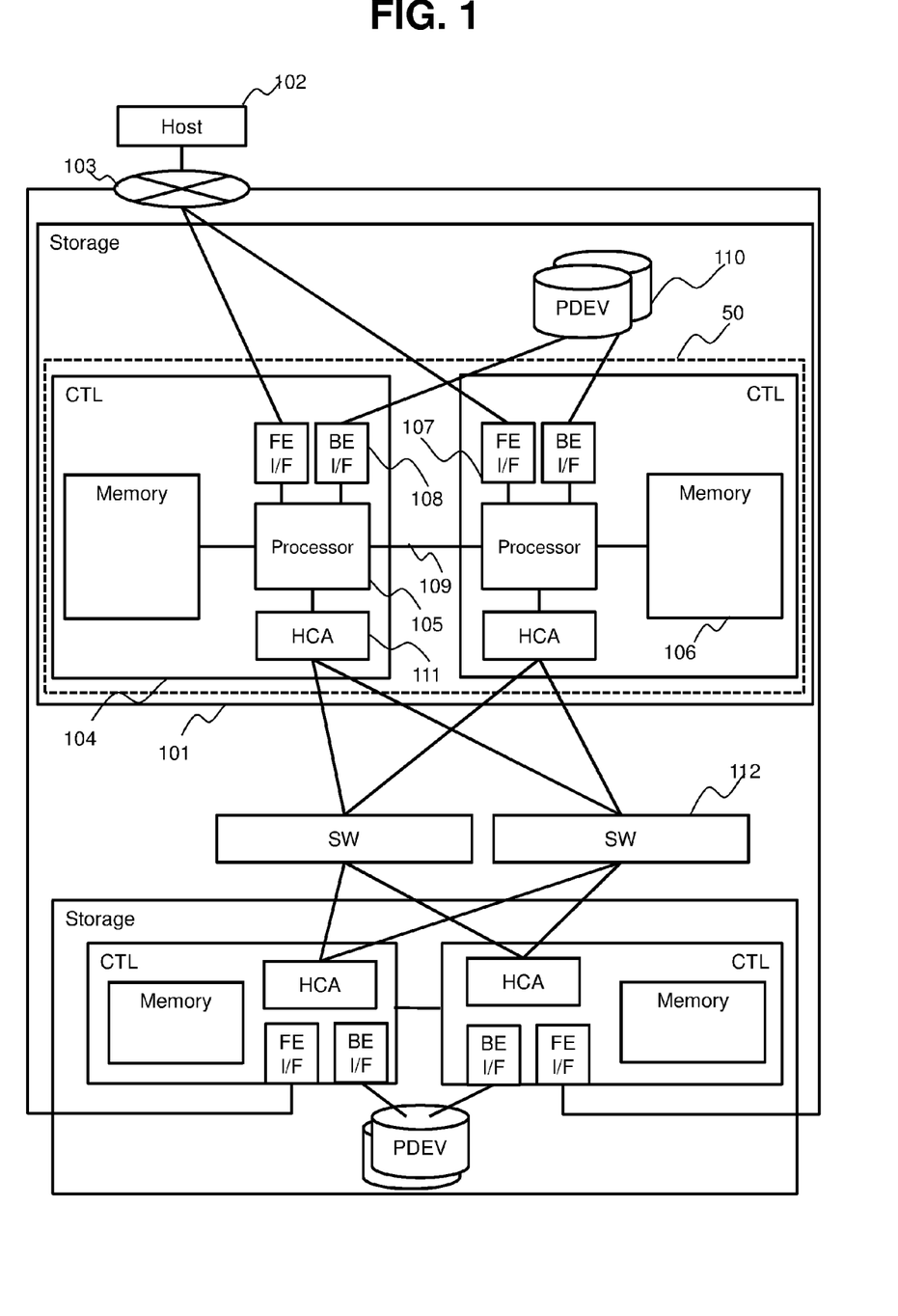
FIG. 1 is a diagram illustrating a configuration example of a computer system according to an embodiment.

FIG. 1 is a diagram illustrating a configuration example of a computer system according to an embodiment.

The computer system is configured with a scale-out type storage system, a host 102, and an external network 103 coupling these. The scale-out type storage system includes a plurality of storage apparatuses 101. The storage apparatuses 101 are tightly coupled. There may be a plurality of hosts 102.

Each of the plurality of storage apparatuses 101 will be described using an example of one storage apparatus 101.

The storage apparatus 101 includes a plurality of PDEVs 110 and a controller unit 50. The controller unit 50 includes a plurality of storage controllers (hereinafter, CTLs) 104. The plurality of CTLs 104 are, for example, duplex CTLs. The plurality of PDEVs 110 are coupled to each of the plurality of CTLs 104.

The CTL 104 includes a memory 106, an FE I/F (Front End interface) 107, a BE I/F (Back End Interface) 108, an HCA (Host Channel Adapter) 111 and a processor (for example, a microprocessor) 105 coupled to these. The CTL 104 may have one or more various kinds of components.

Further, the CTL 104 is coupled to other CTLs 104 via a path 109 between CTLs. Each CTL 104 can access memories 106 of other CTLs 104 via the path 109 between CTLs by a processor 105 (or a DMA (Direct Memory Access) circuit, or the like, which is not illustrated).

Hereinafter, to simplify the description, it is assumed that two CTLs 104 are provided for one storage apparatus 101. However, there may be three or more CTLs 104. Further, in the case where the processor 105 is a multicore processor, a plurality of processors may be logically managed regarding some cores within the processor as a group.

The FE I/F 107 is, for example, coupled to the host 102 through an external network 103 such as a SAN (Storage Area Network). Any network can be used as the external network 103 if protocol which allows data communication is used.

The PDEV 110 is coupled to the CTL 104 via the BE I/F 108. The PDEV 110 may be, for example, an HDD (Hard Disk Drive), an SSD (Solid State Drive) or a tape.

The CTL 104 provides a logical volume (hereinafter, a VOL) to the host 102. The VOL may be tangible VOL based on one or more PDEVs 110 or may be a virtual VOL (for example, a VOL conforming to Thin Provisioning) to which a storage area is dynamically allocated from a pool based on one or more PDEVs 110. A plurality of PDEVs 110 may constitute an RAID group for redundancy or a tangible VOL may be a VOL based on the constituted RAID group. The VOL can be provided to the host 102 as a LU (Logical Unit), and can accept a write request and a read request with respect to an address designated by the host 102. It should be noted that one processor 105 which handles I/O processing may be set for each VOL. Further, the host 102 is one example of the host system.

The storage apparatus 101 is coupled to one or more other storage apparatuses 101 via an HCA 111 and one or more SWs (Switches) 112.

In the present embodiment, the storage apparatuses 101 are tightly coupled. In the tightly coupled storage apparatuses, communication protocol used for communication between the storage apparatuses 101 is the same as communication protocol used for communication between devices (components) within the storage apparatus 101. Both communication protocols are, for example, PCIe (PCI-Express). Meanwhile, in the loosely coupled storage apparatuses, communication protocol used for communication between storage apparatuses is different from communication protocol used for communication between devices within the storage apparatus. The former communication protocol is, for example, FC (Fibre Channel) or IP (Internet Protocol), while the latter communication protocol is, for example, PCIe (PCI-Express). It should be noted that definition of tight coupling and loose coupling is as described above.

Figure 2:
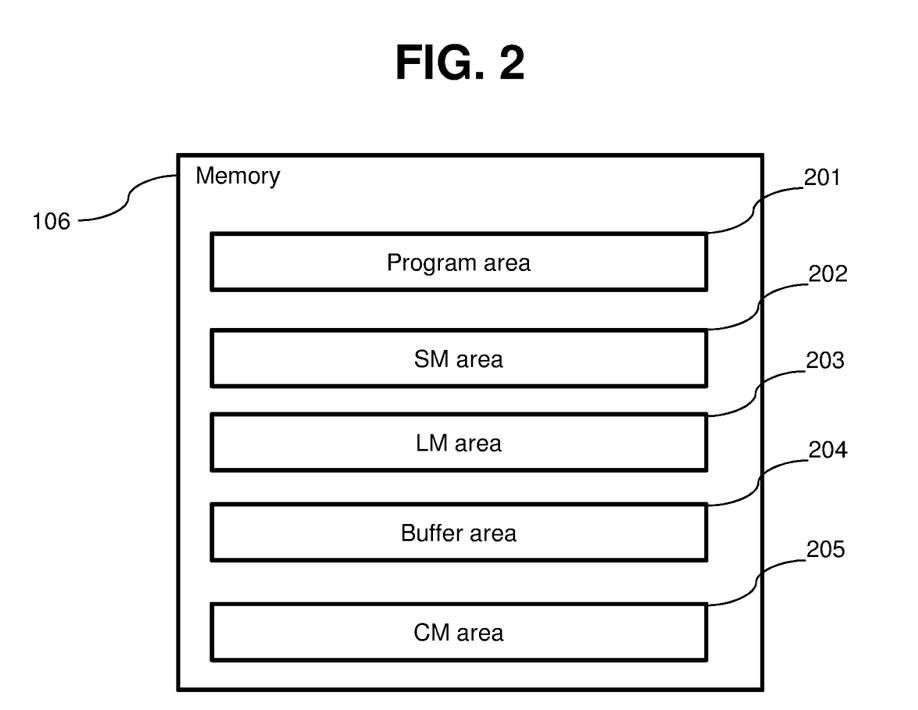
FIG. 2 is a diagram illustrating a logical configuration example of a memory.

FIG. 2 is a diagram illustrating a logical configuration example of the memory 106.

In the memory 106, a program area 201, a shared memory (SM) area 202, a local memory (LM) area 203, a buffer area 204, and a cache memory (CM) area 205 are secured.

The program area 201 is an area in which each program used by the processor 105 to perform processing is stored.

The SM area 202, which is an area accessed from all processors, is an area in which various kinds of management tables are stored.

The LM area 203, which is an area existing for each processor 105, is an area accessed from only a specific processor 105.

The buffer area 204 and the CM area 205 are areas in which data is temporarily stored when data is transferred through the FE I/F 107, the BE I/F 108, the path 109 between CTLs, or the like. It should be noted that the CM area 205 is configured with a plurality of cache segments (an example of a CM sub-area), and the area is secured in units of cache segments. Further, data read from the buffer area 204 is not left in the buffer area 204. Meanwhile, data read from the CM area 205 is left in the CM area 205.

Figure 3:
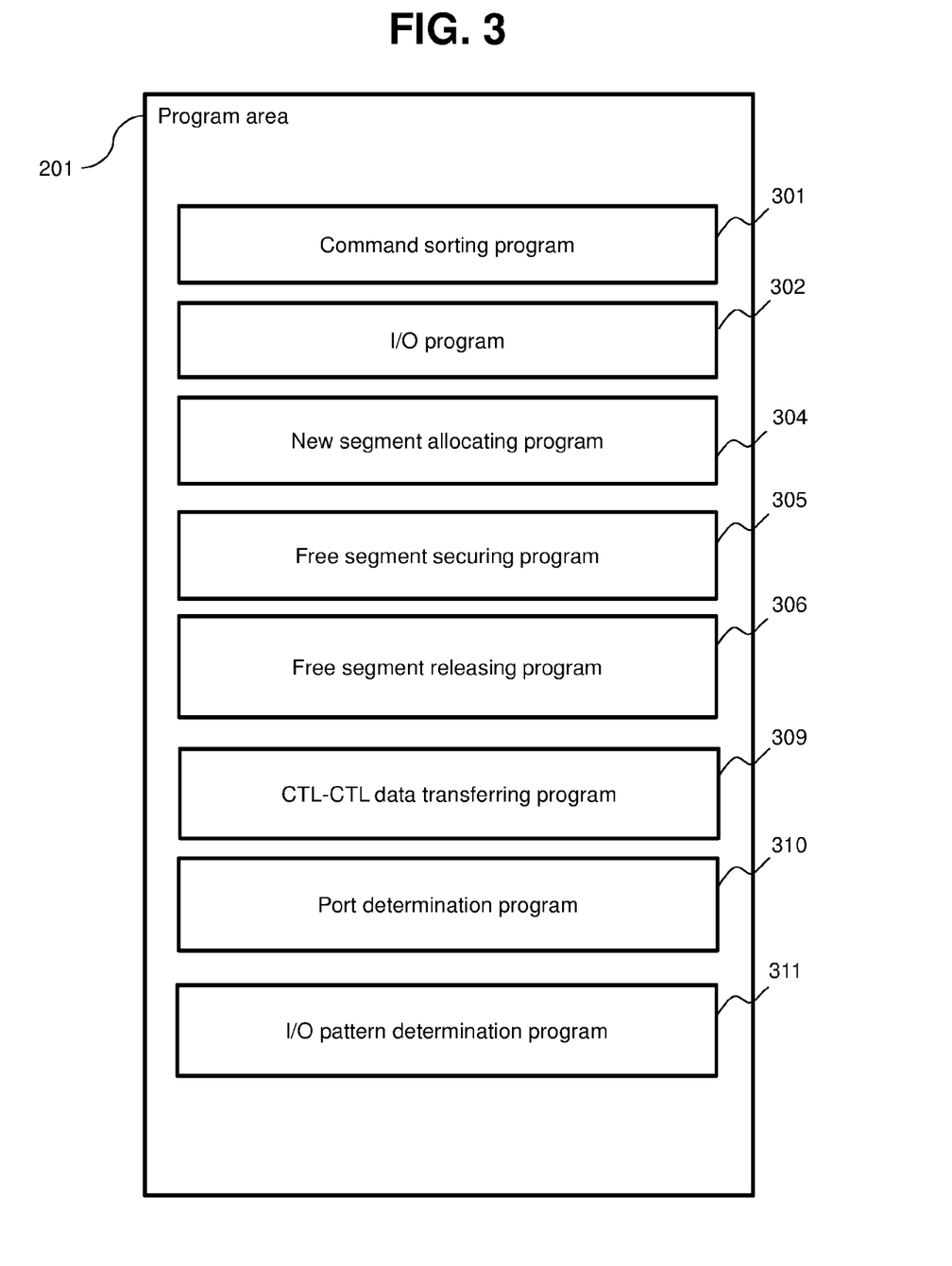
FIG. 3 is a diagram illustrating an example of a program stored in a program area.

FIG. 3 is a diagram illustrating an example of a program stored in the program area 201.

In the program area 201, for example, a command sorting program 301, an I/O program 302, a new segment allocating program 304, a free segment securing program 305, a free segment releasing program 306, a CTL-CTL data transferring program 309, a port determination program 310 and an I/O pattern determination program 311 are stored.

A read/write request from the host 102 is sorted to the processor 105 which handles I/O processing of the VOL which is a target of read/write by the command sorting program 301. Then, the processor 105 which receives the read/write request (processor 105 which handles I/O processing) executes read/write processing of a target area according to the read/write request by executing the I/O program 302. At this time, at least one of staging (read of data from the PDEV 110 to the CM area 205) and destage (write of data from the CM area 205 to the PDEV 110) is executed by the I/O program 302.

Figure 10:
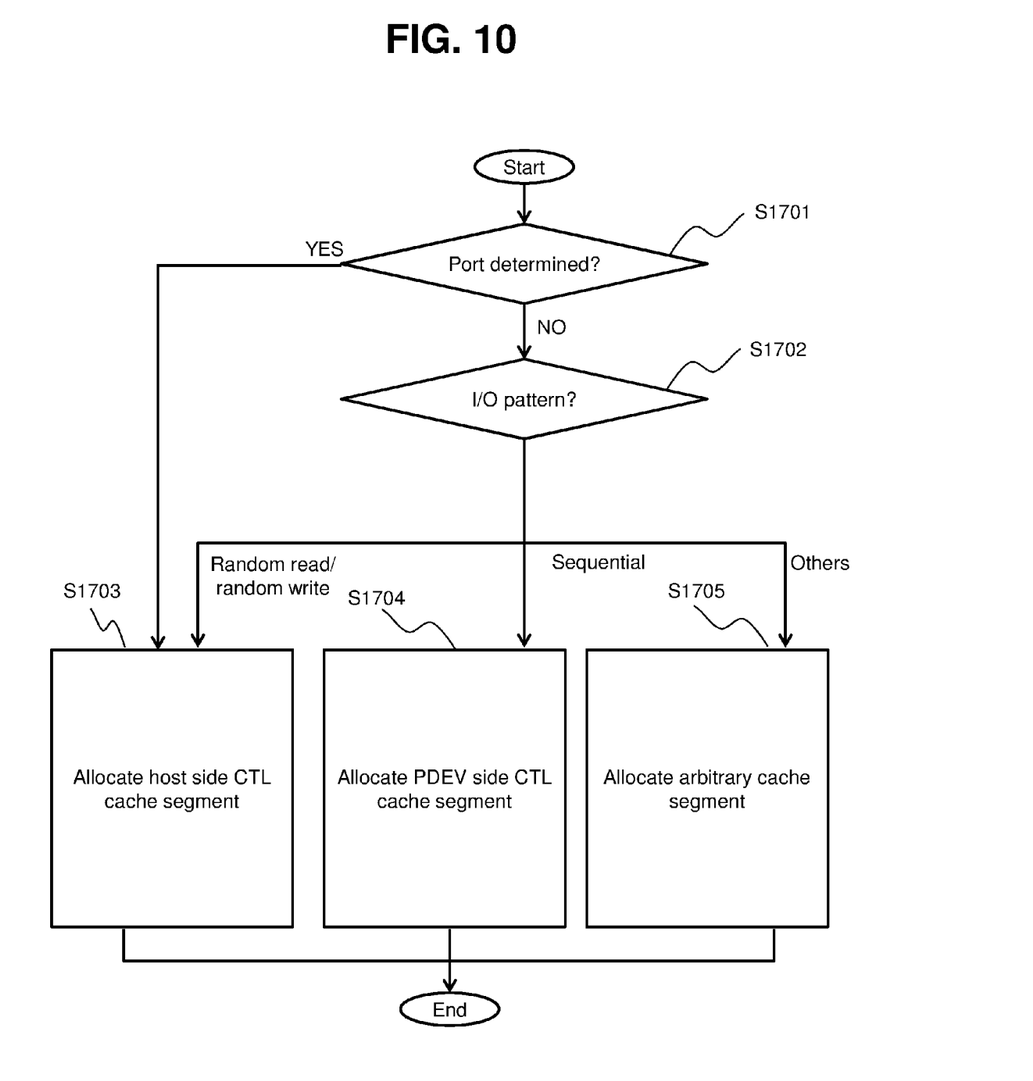
FIG. 10 is a flowchart illustrating flow of cache destination CTL determination processing.

The I/O program 302 determines a cache destination CTL (CTL having a CM area 205 in which a cache segment is newly secured) 104 based on a determination result of the port determination program 310 (determination result of S1701 in FIG. 10) and a determination result of the I/O pattern determination program 311 (determination result of S1702 in FIG. 10). Then, the new segment allocating program 304 executes processing of allocating a new cache segment from the CM area 205. In the allocating processing, the free segment securing program 305 secures a free cache segment by securing a shared free cache segment. The free segment releasing program 306 increases the shared free cache segment by releasing the free cache segment.

Data transfer between the CTLs 104 is executed by the CTL-CTL data transferring program 309.

Figure 4:
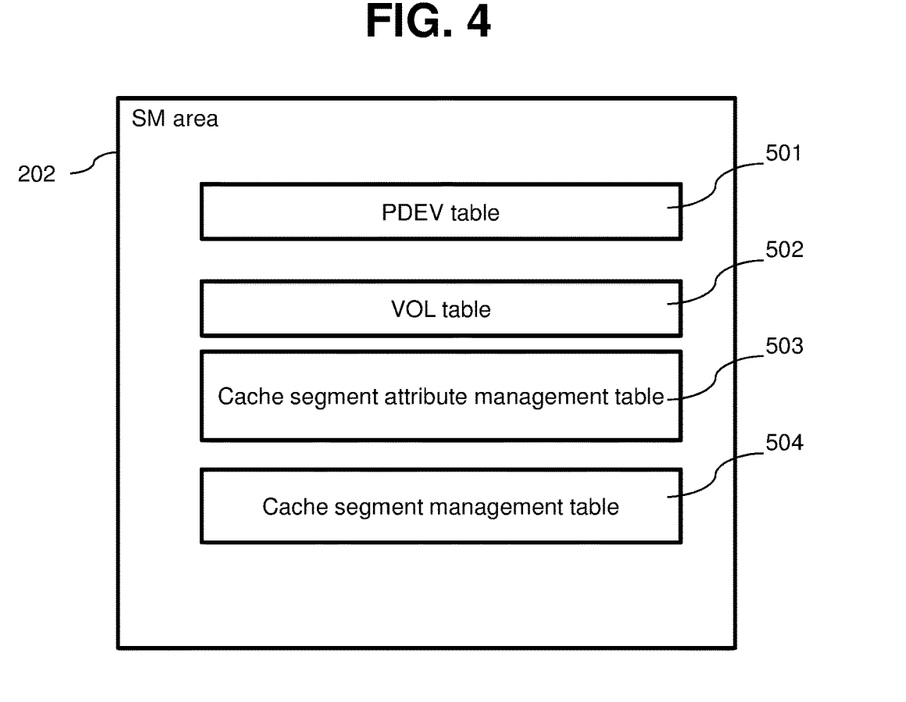
FIG. 4 is a diagram illustrating an example of information stored in a shared memory area.

FIG. 4 is a diagram illustrating an example of information stored in the SM area 202.

In the SM area 202, a PDEV table 501, a VOL table 502, a cache segment attribute management table 503 and a cache segment management table 504 are stored. The PDEV table 501 indicates correspondence relationship between the storage apparatus 101 and the PDEV 110. The VOL table 502 indicates correspondence relationship between the PDEV 110 and the VOL. The cache segment is managed using the cache segment attribute management table 503 and the cache segment management table 504. Information within the SM area 202 may be copied to the memories 106 of the plurality of CTLs 104.

Figure 5:
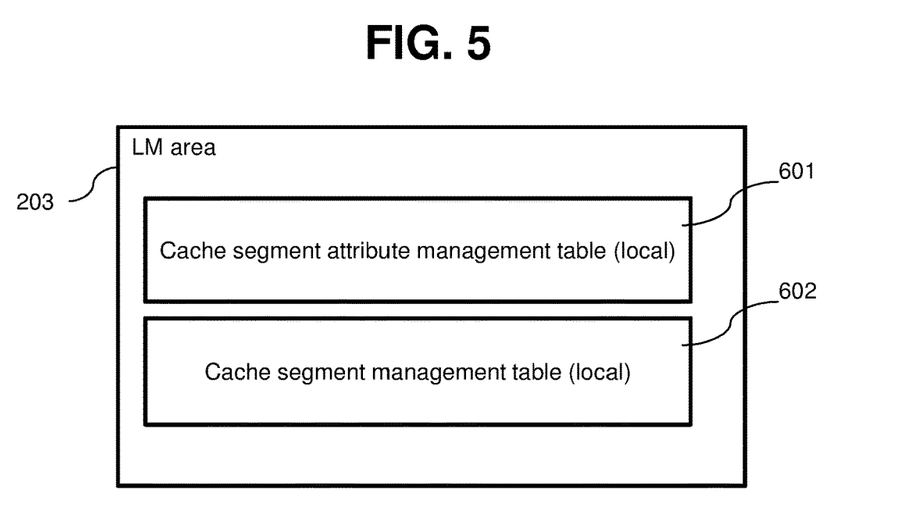
FIG. 5 is a diagram illustrating an example of information stored in a local memory area.

FIG. 5 is a diagram illustrating an example of information stored in the LM area 203.

In the LM area 203, a cache segment attribute management table (local) 601 and a cache segment management table (local) 602 are stored.

Figure 6:
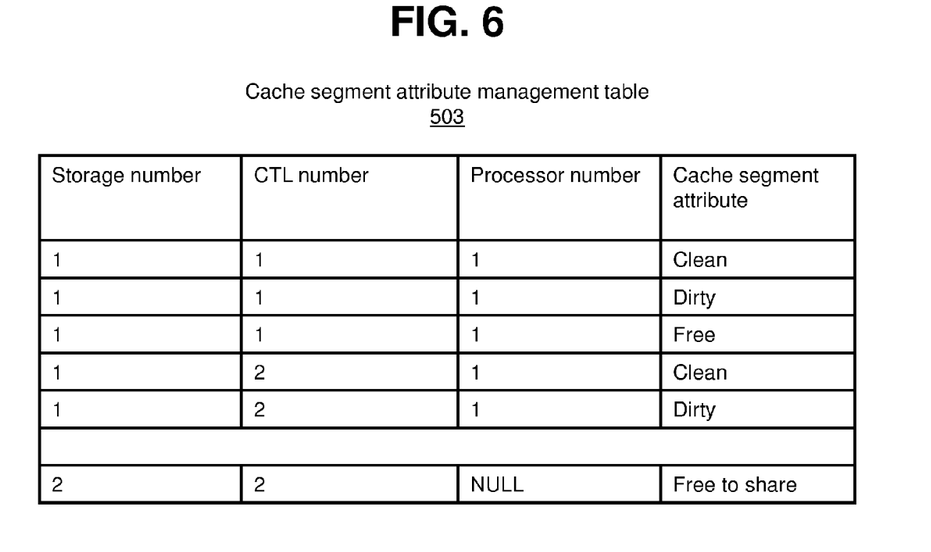
FIG. 6 is a diagram illustrating a configuration example of a cache segment attribute management table.

FIG. 6 is a diagram illustrating a configuration example of the cache segment attribute management table 503.

Each entry (record) held by the cache segment attribute management table 503 stores a storage number, a CTL number, a processor number and a cache segment attribute.

The storage number is an identification number of the storage apparatus 101. The CTL number is an identification number of the CTL 104. The processor number is an identification number of the processor 105. The cache segment attribute indicates an attribute of the cache segment (one of clean, dirty, free and free to share). "Clean" means a secured cache segment in which data stored in the PDEV 101 is stored (data within a clean cache segment can be referred to as "clean data"). "Dirty" means a secured cache segment including data not stored in the PDEV 110 (data within a dirty cache segment can be referred to as "dirty data"). "Free" means a secured cache segment which is a candidate to be allocated as a storage destination cache segment (however, data does not logically exist). "Free to share" means unsecured cache segment (data does not logically exist).

Because the cache segment attribute management table (local) 601 has the same configuration as that of the cache segment attribute management table 503, description will be omitted.

In the present embodiment, the new segment allocating program 304 allocates a free cache segment to the processor 105 which handles I/O as a data storage destination to store (cache) data in a cache area. An attribute of the cache segment changes from free to clean or dirty according to a state of the stored data.

Figure 7:
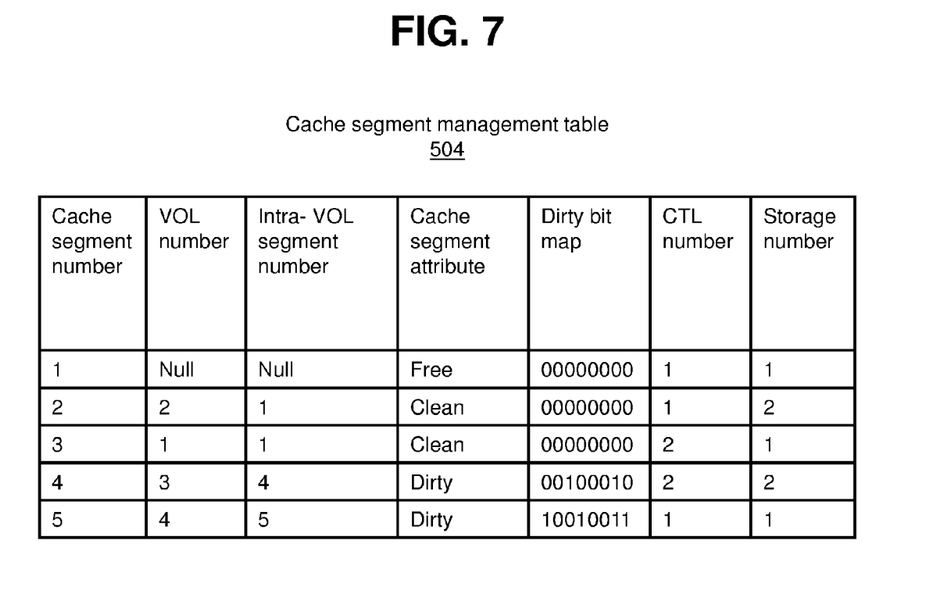
FIG. 7 is a diagram illustrating a configuration example of a cache segment management table.

FIG. 7 is a diagram illustrating a configuration example of the cache segment management table 504.

The cache segment management table 504 has an entry for each cache segment. Each entry stores a cache segment number, a VOL number, an intra-VOL segment number, a cache segment attribute, a dirty bit map, a CTL number and a storage number.

The cache segment number is an identification number of a cache segment. The VOL number is an identification number of a storage destination VOL of data to be stored in a cache segment. The VOL segment number is an identification number of a storage destination VOL segment (an example of an area constituting the VOL) of data to be stored in a cache segment. The VOL is configured with a plurality of VOL segments, and a size of each VOL segment is the same as a size of the cache segment. The cache segment attribute indicates an attribute (one of clean, dirty, free and free to share) of the cache segment. The dirty bit map indicates whether or not each of a plurality of pieces constituting data within the cache segment is dirty. If even one piece of data within the cache segment includes a dirty bit, the data is dirty data. The CTL number is an identification number of a CTL to which the cache segment belongs. The storage number is an identification number of a storage apparatus to which the cache segment belongs.

Because the cache segment management table (local) 602 has the same configuration as that of the cache segment management table 504, description will be omitted.

Reference is executed on the tables (local) 601 and 602, and updating is executed on both the tables 503 and 504, and the tables (local) 601 and 602. However, concerning a shared free cache segment, because there is no copy to the LM area 203, access to the SM area 202 is executed.

Now, there is a problem as described in the specific example with reference to FIG. 8 and FIG. 9 in a comparative example of the storage system including tightly coupled storage apparatuses.

Therefore, in the present embodiment, in the case where one of the plurality of storage apparatuses 101 receives an I/O request (write/read request) in which an address of the VOL is designated, cache destination CTL determination processing is performed. In the cache destination CTL determination processing, a cache destination CTL 104 in which I/O data which is data conforming to the received I/O request is to be cached is determined based on at least one of the target I/O pattern and the coupling mode. The I/O data (write/read data) is cached in the CM area 205 of the cache destination CTL 104. The target I/O pattern is an I/O pattern to which I/O conforming to the received I/O request belongs among a plurality of I/O patterns. Each of the plurality of I/O patterns is a pattern relating to whether an I/O destination address in the VOL is random or sequential. The coupling mode indicates whether or not a storage apparatus receiving an I/O request in which the same address as an address designated in the received I/O request is designated is determined.

FIG. 10 is a flowchart illustrating flow of the cache destination CTL determination processing. The cache destination CTL determination processing is executed by at least one of a plurality of CTLs 104 in the storage system. In the present embodiment, it is assumed that the cache destination CTL determination processing is executed by a CTL which receives an I/O request.

Figure 11:
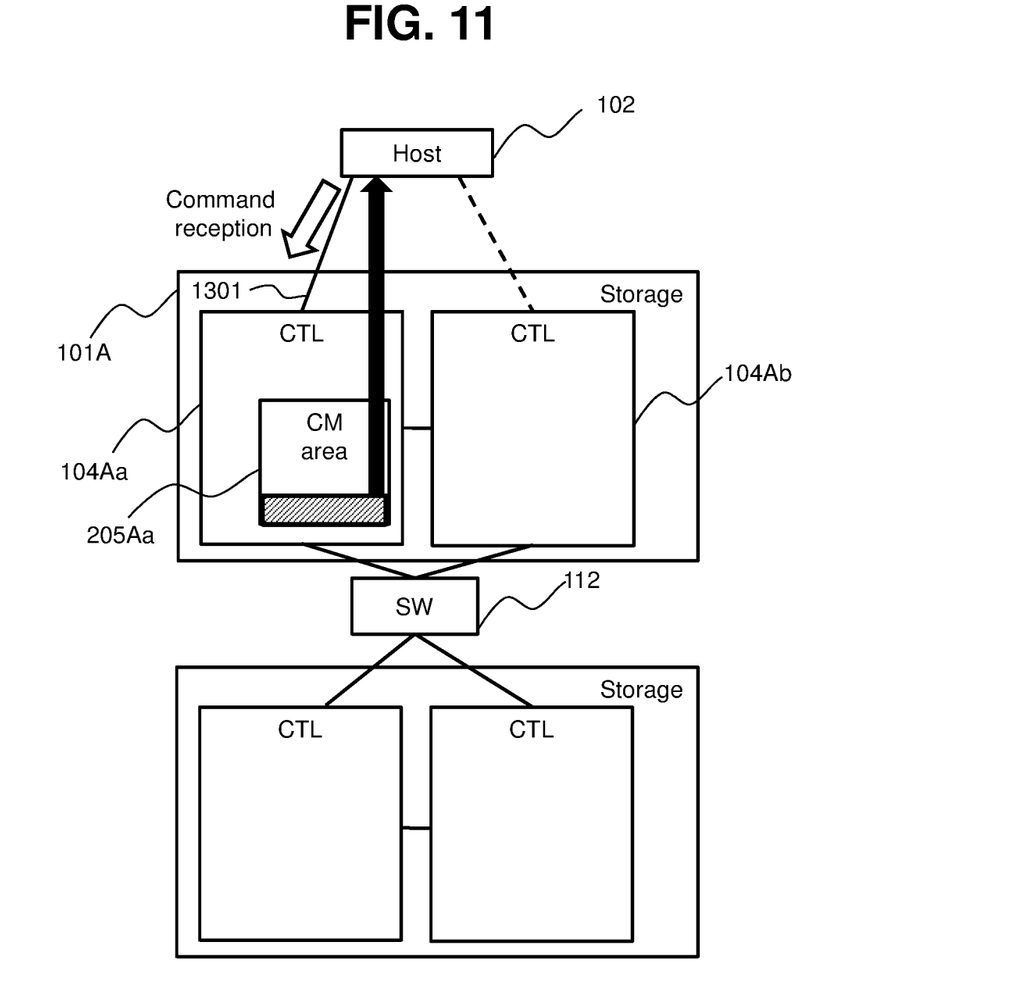
FIG. 11 is an explanatory diagram of an example of advantages of a CTL having a determined port being a cache destination CTL.

The port determination program 310 determines whether or not a port which receives an I/O request from the host 102 is determined (for example, whether or not a port which receives an I/O request in which the same address as an address designated in the I/O request received this time is designated is determined) (S1701). The "port" is a port of the FE I/F 107 of the CTL. One or more FE I/Fs 107 of one CTL 104 have one or more ports. A port for which it is judged that the port is determined to receive an I/O request can be referred to as a "determined port". A specific example of the determined port is as illustrated in FIG. 11. That is, a port coupled to a path 1103 which has the highest priority according to ALUA (Asymmetric Logical Unit Access), among a plurality of paths between the CTLs 104Aa and 104Ab of the host side storage apparatus (storage apparatus receiving the I/O request) 101A and the host 102 is an example of the determined port. Alternatively, a port coupled to the only path by which communication is possible (for example, a single path), among a plurality of paths between the CTLs 104Aa and 104Ab and the host 102, is an example of the determined port.

In the case where the determination result in S1701 is affirmative (S1701: YES), the new segment allocating program 304 selects a free cache segment from the CM area 205Aa within the CTL 104Aa having the determined port with reference to the tables 503 and 504 as illustrated in FIG. 11, and allocates the selected free cache segment to an I/O destination VOL segment which conforms to the I/O request. By this means, an attribute of the cache segment is updated from free to dirty or clean, and an identification number of the allocation destination VOL segment is associated with the cache segment (a cache segment table in FIG. 7 is updated). Hereinafter, because similar processing is performed concerning allocation of the cache segment, description of allocation of the cache segment will be simplified. According to S1703 after S1701: YES, because the CM area 205Aa of the CTL 104Aa having the determined port (that is, the CTL 104Aa which is to surely receive an I/O request) becomes a cache destination, it is possible to avoid occurrence of useless data transfer as described with reference to FIG. 8. For example, in the case where a read request in which the same address as an address designated in a read request received this time is designated is received, data can be transferred from the CM area 205Aa within the CTL 104Aa which receives the read request to the host 102, and it is not necessary to perform two-stage transfer described with reference to FIG. 8. It should be noted that, in the case where the cache segment is made duplex, a cache segment may be allocated from other CTLs within the same storage apparatus as the CTL which is set as the cache destination or a cache segment may be allocated from CTLs within other storage apparatuses coupled via a SW 112.

In the case where the determination result in S1701 is negative (S1701: NO), the I/O pattern determination program 311 determines the target I/O pattern. Port determination is prioritized over I/O pattern determination. As a result, regardless of I/O pattern determination, if there is a determined port, the CTL 104 having the determined port becomes a cache destination. By this means, it is possible to avoid occurrence of the above-described useless data transfer.

In the case where the target I/O pattern (I/O pattern to which I/O conforming to the received I/O request belongs among a plurality of I/O patterns) is either random read or random write as a result of the determination result in S1702, as illustrated in FIG. 11, the new segment allocating program 304 allocates a free cache segment of a CM area (205Aa) of any CTL (for example, 104Aa) of the host side storage apparatus 101A to the I/O destination VOL segment conforming to the I/O request (S1703). That is, here, unlike in the case where S1701 is YES, an arbitrary CTL 101 may be selected (for example, randomly or in a round-robin manner) from the storage apparatus 101 which receives the I/O request. The reason why the host side storage apparatus 101 is set as the cache destination is that the I/O request in which the VOL provided by a storage apparatus 101 is designated is received by that storage apparatus 101. The reason why an arbitrary CTL 101 is set as the cache destination from the storage apparatus 101 which receives the I/O request is that it is unknown which CTL will receive the I/O request.

Figure 12:
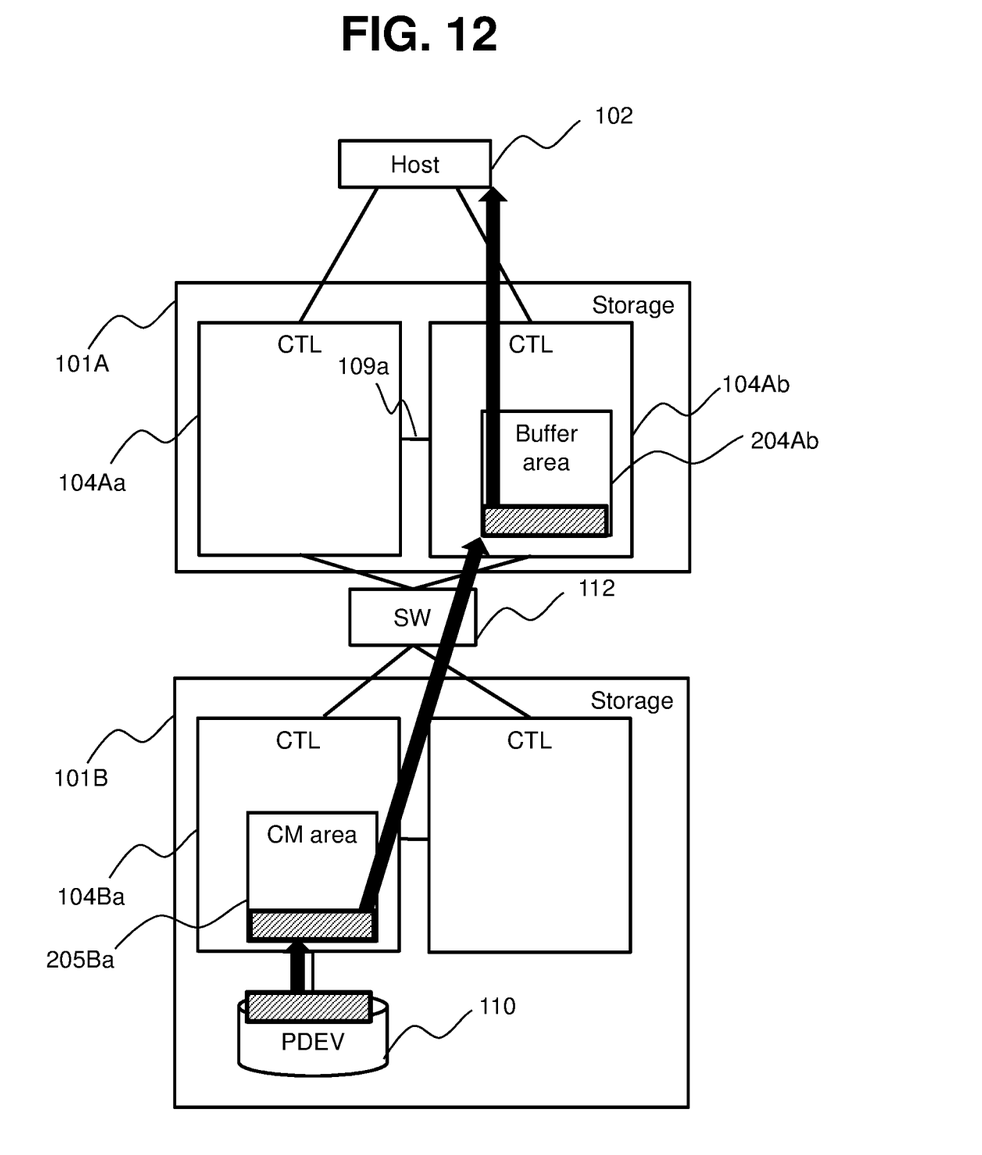
FIG. 12 is an explanatory diagram of an example of advantages of a PDEV side CTL being the cache destination CTL.

In the case where the target I/O pattern is sequential read as a result of the determination in S1702, as illustrated in FIG. 12, the new segment allocating program 304 allocates a free cache segment of the CM area (205Ba) within any CTL (for example, 104Ba) of the storage apparatus (PDEV side storage apparatus) 101B having the PDEV (PDEV which is the basis of the designated VOL) 110 in which read data conforming to the read request is stored to a read source VOL segment conforming to the read request (S1704). In S1704, one or more cache segments are allocated to one or more VOL segments continuously following the read source VOL segment from the CM area 205 of the same CTL 104 (or another CTL 104) within the PDEV side storage apparatus 101. Other data than the read data which can be sequentially read is read ahead in the CM area 205 (allocated cache segment) within the PDEV side storage apparatus 101, for example, by the I/O program 302. According to S1704, in an I/O pattern in which data is read ahead as in sequential read, because the PDEV side CTL 104Ba becomes the cache destination, it is possible to avoid occurrence of useless data transfer between CTLs as described with reference to FIG. 9. That is, as illustrated in FIG. 12, among the host side CTLs 104Aa and 104Ab, whichever receives a read request in which any of read ahead data is made a read target, data which is the read target can be transferred from the PDEV side CM area 205Ba to the buffer area (204Ab) of the host side CTL (for example, 104Ab) which receives the read request, via the SW 112. Therefore, it is not necessary to transfer data between CTLs at the host side storage apparatus 101A.

In the case where the target I/O pattern does not correspond to any of random read, random write and sequential read as a result of the determination in S1702, the new segment allocating program 304 allocates a free cache segment of a CM area of an arbitrary CTL 104 to the I/O destination VOL segment which conforms to the I/O request (S1705). An arbitrary CTL 104 may be selected randomly or in a round-robin manner.

According to the present embodiment, the cache destination CTL is determined based on at least one of the /O pattern and the coupling mode. By this means, it is possible to avoid useless data transfer, so that it is possible to achieve higher performance.

It should be noted that the present invention is not limited to the above-described embodiments, and incorporates various modified examples. For example, the above-described embodiments are described in detail so that the present invention can be easily understood, the present invention is not always limited to the configuration including all the described components. Further, it is possible to replace part of components in one embodiment with components in other embodiments. Further, it is possible to add part of components in one embodiment to components in other embodiments. Still further, it is possible to add, delete, or substitute other components for part of components in each embodiment.

Further, part or all of each component, function, processing unit, processing means, or the like described above may be implemented with hardware, for example, by being designed with an integrated circuit. Further, each component, function, or the like, may be implemented with software by a processor interpreting and executing a program implementing each function. Information such as a program, a table and a file which implements each function can be placed in a storage device such as a memory, a hard disk and an SSD, or a storage device such as an IC card and an SD card.

Further, only control lines and information lines which can be required for explanation are described, and all the control lines and information lines of a product are not necessarily described. Actually, it can be considered that almost all components are coupled to each other.

REFERENCE SIGNS LIST

101 Storage apparatus

The invention claimed is:
1. A storage system coupled to a host system, comprising:
a plurality of storage apparatuses,
wherein each of the plurality of storage apparatuses is coupled to the host system,
each of the plurality of storage apparatuses comprises a storage device and a cache memory area in which data input/output from/to the storage device is to be cached,
each storage apparatus manages a cache memory area within any other storage apparatus coupled to the storage apparatus as well as a cache memory area within the storage apparatus and can input/output data to/from the cache memory area of any other storage apparatus,
in the case where any one of the plurality of storage apparatuses receives an I/O (Input/Output) request in which an address of a logical volume is designated, at least one of the plurality of storage apparatuses determines a cache destination storage apparatus in which I/O data which is data conforming to the received I/O request is to be cached based on at least one of a target I/O pattern and a coupling mode,
the target I/O pattern is an I/O pattern to which I/O conforming to the received I/O request belongs among a plurality of I/O patterns,
each of the plurality of I/O patterns is a pattern relating to whether an I/O destination address in the logical volume is random or sequential, and
the coupling mode indicates whether or not a storage apparatus which is to receive the I/O request is determined.

2. The storage system according to claim 1,
wherein, in the case where the target I/O pattern is one of random write and random read, the cache destination storage apparatus is a storage apparatus which receives the I/O request.

3. The storage system according to claim 1,
wherein, in the case where the target I/O pattern is sequential read, the cache destination storage apparatus is a storage apparatus having a storage device which stores the I/O data.

4. The storage system according to claim 1,
wherein, in the case where the coupling mode indicates that the storage apparatus which is to receive the I/O request is determined, the cache destination storage apparatus is a host side storage apparatus which is the storage apparatus which receives the I/O request.

5. The storage system according to claim 4,
wherein the host side storage apparatus comprises a plurality of storage controllers,
each of the plurality of storage controllers is coupled to the host system,
each of the plurality of storage controllers has a cache memory area, and
in the case where the coupling mode indicates that a storage controller which is to receive an I/O request is determined, a cache destination storage controller in which the I/O data is to be cached is a determined storage controller which is a storage controller determined to receive the I/O request among the plurality of storage controllers.

6. The storage system according to claim 4,
wherein, in the case where the coupling mode indicates that the storage apparatus which is to receive the I/O request is not determined, at least one of the plurality of storage apparatuses determines the cache destination storage apparatus based on the target I/O pattern.

7. The storage system according to claim 6,
wherein, in the case where the target I/O pattern is one of random write and random read, the cache destination storage apparatus is the host side storage apparatus.

8. The storage system according to claim 7,
wherein the host side storage apparatus comprises a plurality of storage controllers,
each of the plurality of storage controllers is coupled to the host system,
each of the plurality of storage controllers has a cache memory area, in the case where the coupling mode indicates that a storage controller which is to receive an I/O request is determined, a cache destination storage controller in which the I/O data is to be cached is a determined storage controller which is a storage controller determined to receive the I/O request among the plurality of storage controllers, and in the case where the coupling mode indicates that a storage controller which is to receive an I/O request is not determined and the target I/O pattern is one of random write and random read, the cache destination storage controller is one of the plurality of storage controllers.

9. The storage system according to claim 8,
wherein, in the case where the target I/O pattern is sequential read, the cache destination storage apparatus is a storage apparatus having a storage device which stores the I/O data, and
data which can be read according to sequential read is read ahead in a cache memory area of the cache destination storage apparatus.

10. The storage system according to claim 9,
wherein, in the case where the target I/O pattern is none of random write, random read and sequential read, the cache destination storage apparatus is one of the plurality of storage apparatuses.

11. The storage system according to claim 10,
wherein each of the plurality of storage apparatuses communicates with the host system using ALUA (Asymmetric Logical Unit Access), and
the determined storage controller is a storage controller coupled to a path with the highest priority among a plurality of paths between the plurality of storage controllers and the host system.

12. The storage system according to claim 10,
wherein the determined storage controller is a storage controller coupled to a single path by which communication is possible, among a plurality of paths between the plurality of storage controllers and the host system.

13. The storage system according to claim 11,
wherein the determined storage controller is a storage controller coupled to a path which has the highest priority according to ALUA (Asymmetric Logical Unit Access), among a plurality of paths between the plurality of storage controllers and the host system.

14. The storage system according to claim 10,
wherein the storage system is a scale-out type storage system.

15. A cache control method of a storage system comprising a plurality of storage apparatuses respectively coupled to a host system, in which each of the plurality of storage apparatuses comprises a storage device and a cache memory area in which data to be input/output to/from the storage device is to be cached, and each storage apparatus manages a cache memory area within any other storage apparatus coupled to the storage apparatus as well as a cache memory area within the storage apparatus and can input/output data to/from the cache memory area of any other storage apparatus,
the cache control method comprising:
receiving an I/O (Input/Output) request in which an address of a logical volume is designated at one of the plurality of storage apparatuses; and
determining a cache destination storage apparatus in which I/O data which is data conforming to the received I/O request is to be cached based on at least one of a target I/O pattern and a coupling mode,
wherein the target I/O pattern is an I/O pattern to which I/O conforming to the received I/O request belongs among a plurality of I/O patterns,
each of the plurality of I/O patterns is a pattern relating to whether an I/O destination address in the logical volume is random or sequential, and
the coupling mode indicates whether or not a storage apparatus which is to receive an I/O request is determined.

* * * * *